Sept. 28, 1937.  L. C. SPENCER  2,094,382
SPACING BAR FOR TROLLEY SYSTEMS
Filed June 26, 1936
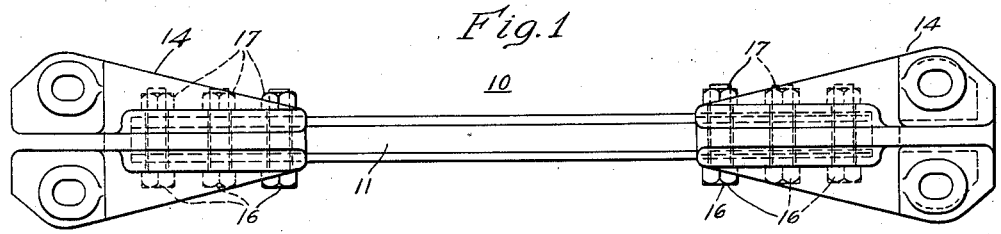
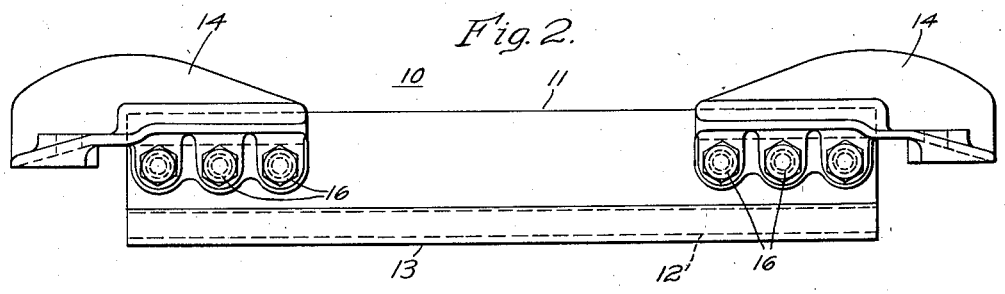
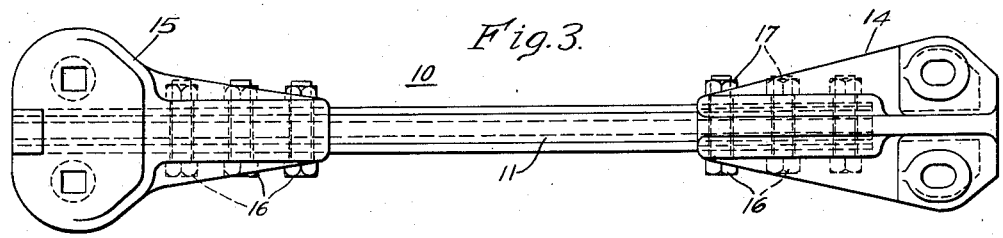
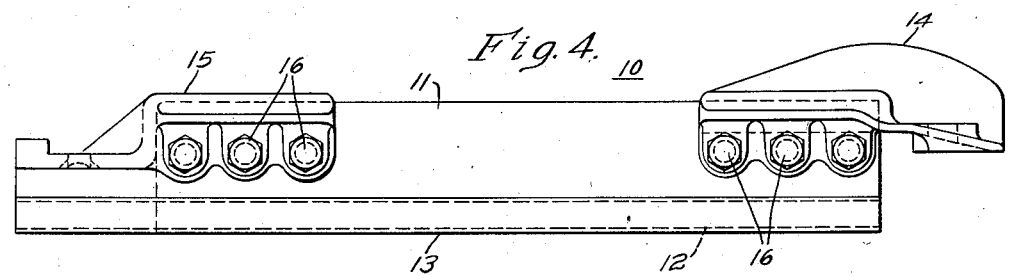
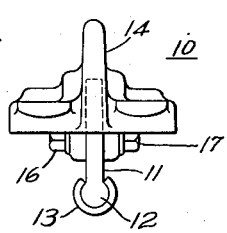
WITNESSES:
C. J. Weller.
F. D. Giolma
INVENTOR
Lon C. Spencer.
ATTORNEY Patented Sept. 28, 1937

2,094,382

UNITED STATES PATENT OFFICE 2,094,382

SPACING BAR FOR TROLLEY SYSTEMS

Lon C. Spencer, Indianapolis, Ind.

Application June 26, 1936, Serial No. 87,358

10 Claims. (Cl. 191—37)

My invention relates, generally, to overhead trolley systems and it has reference in particular to a metallic spacing bar for use at intersections in overhead trolley wire systems.

In power systems for trolley buses, both the positive and negative conductors must be carried overhead, there being no ground return, as the bus is insulated from the ground by the rubber tires. As there is considerable difference of potential between these conductors, they must necessarily be insulated from one another, and, therefore, are usually mounted about two feet apart. The problem of construction at intersections thus becomes more complicated than in the case of the intersections of the overhead conductors of a street car system. There is not only the problem of the isolating of the conductors of opposite polarity, but also of providing as continuous a source of power as possible for vehicles crossing the intersection.

Where the intersection is of a street car line and a bus line, or of two pairs of trolley bus lines, the portions of the conductor or conductors of the one line which must lie between the two conductors of the other line may be quite long, particularly where the angle of intersection of the two lines is small. To use insulating sections for these portions would seriously hamper traffic, for a bus or a street car might readily stall on such a section and then be unable to proceed owing to lack of power. To make such "dead" sections as short as possible, metallic spacers are used, they being electrically connected to one of the conductors, usually the positive, and insulated from the other. Thus, they are in reality short rigid extensions of the trolley wire which aid in carrying a vehicle through the intersection by providing an almost continuous source of power for the vehicle.

Heretofore, such spacers have consisted of bar sections of steel or the like, being heavy and having undesirable wearing qualities, or have been of cast construction, being not only heavy but also expensive.

The object, therefore, of this invention is to provide a spacing bar for overhead trolley systems that shall be light in weight, of strong and rigid construction and have desirable current conducting and wearing qualities.

Another object of this invention is to provide a rigid metallic spacing bar having a renewable wearing surface.

A still further object of this invention is to provide a metallic spacing bar having a runner portion that is protected by means of a renewable sheath of conducting material.

A still further object of this invention is to provide a metallic spacing bar which may be easily and economically constructed, readily adapted for a variety of uses, and easy to install and maintain.

Other objects of this invention will in part be obvious, and in part appear hereinafter.

My invention accordingly is disclosed in the embodiment hereof shown in the accompanying drawing, and comprises the features of construction, combination of elements, and arrangement of parts which will be exemplified in the construction hereinafter set forth and the scope of the application which will be indicated in the appended claims.

For a more complete understanding of the nature and scope of my invention, reference may be had to the following detailed description taken in connection with the accompanying drawing, in which Figure 1 is a plan view of a metallic spacing bar embodying my invention.

Fig. 2 is a side elevational view of the spacing bar shown in Fig. 1.

Fig. 3 is a plan view of a similar metallic spacing bar provided with an optional type of end fitting.

Fig. 4 is a side elevational view of the spacing bar shown in Fig. 3, and

Fig. 5 is an end view of a metallic spacing bar embodying my invention.

Referring more particularly to Figs. 1 and 5, the reference number 10 denotes generally a spacing bar embodying the principal features of the invention. In order that the bar may be of strong and rigid construction and also light in weight the body member 11 is preferably composed of some light durable metal such as aluminum or the like.

As shown best in Fig. 5, the body member 11 is provided with a rounded runner portion 12 which in this instance is formed integrally with the body. In order to protect the runner portion from wear, due to the passage of slider shoes and trolley wheels thereover, it is provided with a renewable sheath or wearing surface 13.

The renewable sheath is preferably comprised of a material having good electrical conductivity, such for example, as copper. It may be formed from a flat strip of the desired material by bending the strip into a U-shaped channel which may be readily secured to the runner portion 12 by crimping the sides of the channel around the runner as shown in Fig. 5.

The main body member 11 is provided with suitable end fittings 14 or 15, which may be integral with the main body member, or of the well known detachable form such as used for insulating sections and the like, as shown. The end fittings 14 or 15 are secured to the main body member 11 in a conventional manner by means of bolts 16 and nuts 17.

It is apparent that the spacing bar provided by this invention has many advantages over those forms now in general use. It combines light weight construction with the required strength and rigidity. It is comprised entirely of metal parts which are of a permanent nature and unaffected by weather conditions. Its construction is such that there is only a single inexpensive portion thereof that is subjected to wear by the passage of slider shoes and trolley wheels. The wear portion is readily renewable while the spacing bar is in position in the system, thus greatly decreasing the maintenance cost.

Since certain further changes may be made in the foregoing construction and different embodiments of the invention may be made without departing from the scope thereof, it is intended that all matters set forth in the foregoing description or shown in the accompanying drawing should be considered as illustrative and not in a limiting sense.

I claim as my invention:

1. A spacing bar for overhead trolley systems, comprising, in combination, a body member, a renewable wearing portion adapted to be pressed about an edge of the body member, and fixed end fittings for securing the spacing bar in position.

2. In a metallic spacing bar for trolley systems, in combination, a rigid body member, a renewable conducting portion firmly secured to the under side of the body member, and fixed end means for supporting the body member in position.

3. A spacing bar for overhead trolley systems, comprising, in combination, a rigid lightweight structural body member, a wearing member of high conductivity detachably secured to the under side of the body member, and fixed means for securing the body member in position.

4. A spacing bar for trolley systems, comprising, in combination, a rigid lightweight metallic body member having end fittings for connecting it into position in the system, and a renewable underrun of high conductivity adapted to be clinched about one edge of the body member.

5. In a metallic spacing bar for trolley systems, in combination, an elongated aluminum structural body member having an enlarged wearing face and supporting means at the ends thereof, and a renewable wearing surface of high conductivity comprising a U-shaped sheath secured to the wearing face of the body member, by pressing the sides of the sheath about said wearing surface.

6. In a metallic spacing bar, in combination, a rigid elongated aluminum rib having fixed supporting means at the ends thereof, and a renewable wearing portion of high conductivity crimped along the lower edge of the rib.

7. A spacing bar comprising, in combination, an elongated rigid body member having an integrally formed runner portion on one edge, a renewable wearing surface of high conductivity adapted to be pressed into engagement about the runner portion, and fixed end fittings secured to the ends of the body member for supporting it in position.

8. In a spacing bar for overhead trolley wire systems, in combination, a rigid metallic body member of low specific gravity having a rounded runner portion integral with one edge, a renewable metallic wearing sheath of high conductivity adapted to be crimped about the rounded runner portion, and means secured in fixed relation to the ends of the body member for supporting the spacing bar in operating position.

9. A metallic spacer for overhead trolley wire systems, comprising, in combination, a rigid aluminum body member having an enlarged runner portion on one edge, a renewable metallic wearing surface of high conductivity clinched about the runner portion, and fixed means rigidly secured at the ends of the body member for positioning the spacer.

10. A spacing bar for an overhead trolley wire system comprising, in combination, an elongated rigid aluminum web having one edge thereof enlarged to form a runner portion, a renewable copper wearing sheath adapted to be crimped about the runner portion of the web, and fixed means detachably secured to the web for supporting the spacing bar in position.

LON C. SPENCER.